US012282188B2

(12) United States Patent
Hasegawa et al.

(10) Patent No.: US 12,282,188 B2
(45) Date of Patent: Apr. 22, 2025

(54) RING-RESONATOR FILTER DEVICE

(71) Applicant: FURUKAWA ELECTRIC CO., LTD., Tokyo (JP)

(72) Inventors: Junichi Hasegawa, Tokyo (JP); Noritaka Matsubara, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 737 days.

(21) Appl. No.: 17/444,871

(22) Filed: Aug. 11, 2021

(65) Prior Publication Data

US 2021/0376570 A1 Dec. 2, 2021

Related U.S. Application Data

(63) Continuation of application No. PCT/JP2020/004432, filed on Feb. 5, 2020.

(30) Foreign Application Priority Data

Feb. 14, 2019 (JP) .................................. 2019-024921

(51) Int. Cl.
*G02B 6/122* (2006.01)
*G02B 6/125* (2006.01)

(52) U.S. Cl.
CPC ........... *G02B 6/1223* (2013.01); *G02B 6/125* (2013.01)

(58) Field of Classification Search
None
See application file for complete search history.

(56) References Cited

U.S. PATENT DOCUMENTS

| 2003/0123780 | A1* | 7/2003 | Fischer | G02F 1/035 385/39 |
| 2003/0202743 | A1 | 10/2003 | Shibata | |
| 2003/0235367 | A1 | 12/2003 | Yamazaki | |
| 2004/0040646 | A1 | 3/2004 | Takahashi et al. | |
| 2009/0185803 | A1* | 7/2009 | Uemura | G02B 6/12007 398/43 |
| 2009/0323755 | A1 | 12/2009 | Okayama | |
| 2010/0209045 | A1 | 8/2010 | Okayama | |
| 2014/0307999 | A1 | 10/2014 | Kodanev et al. | |
| 2014/0321805 | A1 | 10/2014 | Yosub et al. | |

(Continued)

FOREIGN PATENT DOCUMENTS

| CN | 1460869 A | 12/2003 |
| CN | 103308476 A | 9/2013 |

(Continued)

OTHER PUBLICATIONS

Translation of JP201671260A (Year: 2016).*

(Continued)

*Primary Examiner* — Chad H Smith
(74) *Attorney, Agent, or Firm* — Oblon, McClelland, Maier & Neustadt, L.L.P.

(57) ABSTRACT

A ring-resonator filter device includes: a waveguide device that includes a core. Further, the core constitutes two ring resonator filters, each of the two ring resonator filters includes two arm portions, a ring-shaped portion, and two optical coupling/branching portions that optically couple the two arm portions and the ring-shaped portion, respectively, and the two ring-shaped portions cross each other.

8 Claims, 8 Drawing Sheets

(56) References Cited

U.S. PATENT DOCUMENTS

| | | |
|---|---|---|
| 2016/0025494 A1 | 1/2016 | Lefevre et al. |
| 2021/0376570 A1 | 12/2021 | Hasegawa et al. |

FOREIGN PATENT DOCUMENTS

| | | | |
|---|---|---|---|
| CN | 105164495 A | | 12/2015 |
| CN | 207542558 U | | 6/2018 |
| CN | 207965209 U | | 10/2018 |
| CN | 109254352 A | | 1/2019 |
| EP | 1 158 326 A2 | | 11/2001 |
| JP | 2001-066444 A | | 3/2001 |
| JP | 2003-315752 A | | 11/2003 |
| JP | 2004-145238 A | | 5/2004 |
| JP | 2005-242141 A | | 9/2005 |
| JP | 2009-169281 A | | 7/2009 |
| JP | 2010-008838 A | | 1/2010 |
| JP | 2010-175935 A | | 8/2010 |
| JP | 2010-186097 A | | 8/2010 |
| JP | 2013-195721 A | | 9/2013 |
| JP | 2014-165384 A | | 9/2014 |
| JP | 2016071260 A | * | 5/2016 |
| JP | 2017-015789 A | | 1/2017 |
| WO | WO 2020/166459 A1 | | 8/2020 |

OTHER PUBLICATIONS

Yutaka Hatakeyama et al., "Loss-Less Multilevel Crossing of Busline Waveguide in Vertically Coupled Microring Resonator Filter", IEEE Photonics Technology Letters, vol. 16, No. 2, Feb. 2004, pp. 473-475.

Office Action issued Sep. 20, 2022, in corresponding Japanese Patent Application No. 2021-120637 (with English Translation), 8 pages.

International Search Report issued Apr. 7, 2020 in PCT/JP2020/004432 filed on Feb. 5, 2020, 3 pages.

* cited by examiner

RING-RESONATOR FILTER DEVICE

CROSS-REFERENCE TO RELATED APPLICATION(S)

This application is a continuation of International Application No. PCT/JP2020/004432, filed on Feb. 5, 2020 which claims the benefit of priority of the prior Japanese Patent Application No. 2019-024921, filed on Feb. 14, 2019, the entire contents of which are incorporated herein by reference.

BACKGROUND

The present disclosure relates to a ring-resonator filter device.

As a device to detect a wavelength of laser light that is output from a semiconductor laser device, a technique of using a device having two optical filters having substantially periodic transmission characteristics with respect to wavelength (also called wavelength locker device) has been disclosed (Japanese Laid-open Patent Publication No. 2014-165384). In the two optical filters, the transmission characteristics are set such that the phases differs from each other in a range of ⅓ to ⅓ of the one cycle.

SUMMARY

There is a need for providing a ring-resonator filter device which is compact in size, and that can make an error from a designed phase difference small.

According to an embodiment, a ring-resonator filter device includes: a waveguide device that includes a core. Further, the core constitutes two ring resonator filters, each of the two ring resonator filters includes two arm portions, a ring-shaped portion, and two optical coupling/branching portions that optically couple the two arm portions and the ring-shaped portion, respectively, and the two ring-shaped portions cross each other.

DETAILED DESCRIPTION

In the related art, next-generation integrated tunable laser assembly (ITLA) is strongly demanded to downsize its casing. In this situation, there is a limit in downsizing the casing in a structure of a wavelength locker device using etalon filters. Accordingly, wavelength lockers using a waveguide device have been having a high degree of expectation. Among them, a silica-based planar lightwave circuit (PLC) device of a high relative refractive-index difference (Δ) type with which a propagation loss is small is regarded as the best part to meet various demands to the wavelength locker devices. In the wavelength locker device using a PLC device, a structure of using ring resonators as two optical filters has been known. Hereinafter, a wavelength locker using a ring resonator is denoted as ring-resonator filter device in some cases.

As described above, in the wavelength locker device, two optical filters are configured to have different phases in transmission characteristics from each other, that is, to have a phase difference. This phase difference is an important parameter to be precisely adjusted because of the nature of characteristics of the wavelength locker device, and it is preferable that an error (for example, manufacturing error) be as small as possible from a designed value.

Hereinafter, embodiments will be explained with reference to the drawings. The embodiments are not intended to limit the present disclosure. Moreover, in description of the drawings, identical reference signs are assigned to identical or corresponding components appropriately. Furthermore, the drawings show schematic illustrations, and it is noted that a relationship in dimensions among respective components, a ratio among the respective components can differ from those in actual situations. Also among the drawings, portions in which a relationship in dimensions thereamong or ratios are different can be included.

First Embodiment

Figure 1:
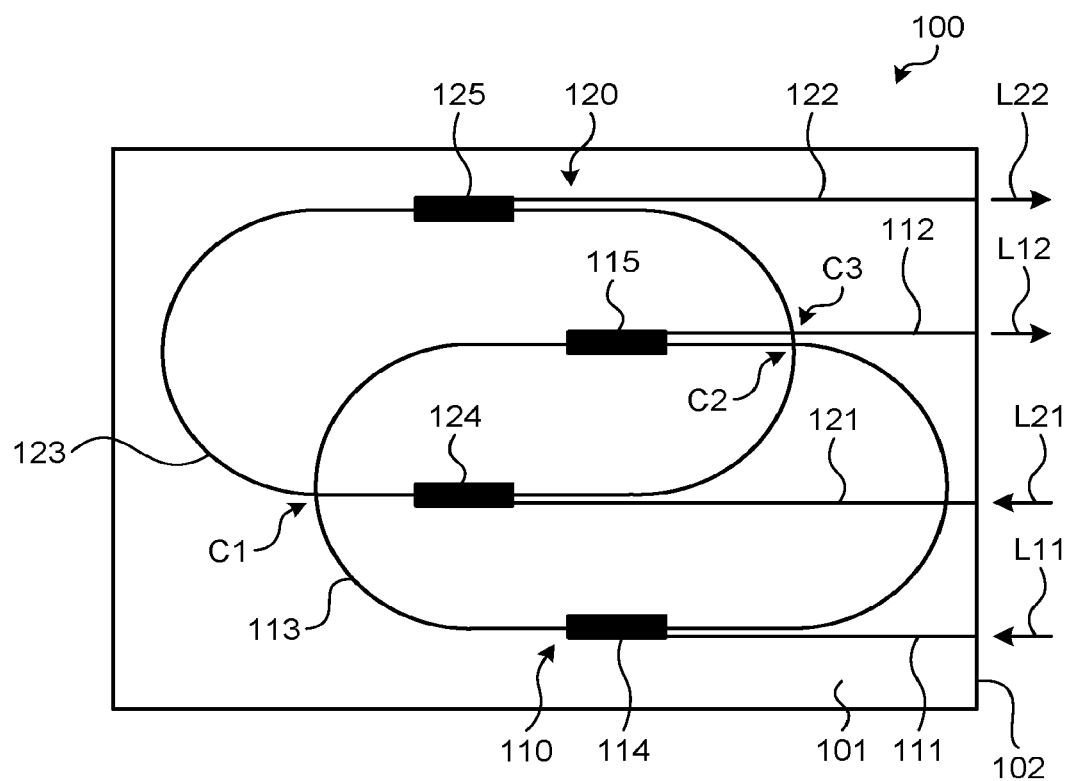
FIG. 1 is a schematic diagram of a ring-resonator filter device according to a first embodiment.

FIG. 1 is a schematic diagram of a ring-resonator filter device according to a first embodiment. This ring-resonator filter device 100 is constituted of a PLC having a ring resonator filters 110, 120 that are constituted of cores, and a cladding 101.

The cladding 101 surrounds a core, and is formed on, for example, a silicon substrate or a glass substrate. The cladding 101 is made from a silica based glass material.

The core is made from a silica based glass material having a refractive index higher than a refractive index of the cladding 101. As such a silica based glass material having a high refractive index, for example, silica glass including, for example, germanium ($GeO_2$) or zirconium ($ZrO_2$) as a dopant to increase the refractive index can be used. Especially, with a so-called $SiO_2$—$ZrO_2$ based material, which is the silica glass including zirconium, the relative refractive index of the core to the cladding 101 can be made higher by, for example, 2.5% or higher and, therefore, it is preferable when downsizing the ring-resonator filter device 100.

The ring resonator filter 110 includes two arm portions 111, 112, a ring-shaped portion 113, optical coupling/branching portions 114, 115 that optically couple the arm portions 111, 112 and the ring-shaped portion 113. Although the arm portions 111, 112 are in a linear shape and the ring-shaped portion 113 is in a rounded rectangle shape in the present embodiment, the shapes are not limited thereto, and the ring-shaped portion 113 may be in, for example, a circular shape or an elliptic shape. Moreover, an oval shape is an example of the rounded rectangle. The rounded rectangle can include two arcs and a line segment extending in a width direction between the two arcs.

The arm portions 111, 112 have one end exposed to a facet 102 of the cladding 101, and are connected at the other end with the optical coupling/branching portions 114, 115, respectively.

The optical coupling/branching portions 114, 115 have a 2×2 structure having two ports on an input side and two ports on an output side, and are of a directional coupling type or of a multi-mode interference (MMI) type, but in the present embodiment, the MMI type is applied.

The arm portions 111, 112, and the ring-shaped portion 113 formed to have cross-sectional sizes to propagate light of a used wavelength (for example, 1.55 μm band) in a single mode according to a relative refractive-index difference to the cladding 101. The optical coupling/branching portions 114, 115 are formed to have cross-sectional sizes to propagate light of a used wavelength (for example, 1.55 μm band) in a multiple mode according to a relative refractive-index difference to the cladding 101, and to obtain a branching ratio of 40:60. Specifically, in the optical coupling/branching portion 114, the branching ratio is set such that 60% of light of a used wavelength that has propagated through the arm portion 111 is coupled with the ring-shaped portion 113. Moreover, in the optical coupling/branching portion 115, the branching ratio is set such that 60% of light of a used wavelength that has propagated through the ring-shaped portion 113 is coupled with the arm portion 112. Furthermore, the optical coupling/branching portions 114, 115 may have a structure in which a side surface portion (in a direction width relative to a propagation direction of light) is topologically optimized.

The ring resonator filter 120 includes two arm portions 121, 122, a ring-shaped portion 123, and optical coupling/branching portions 124, 125 that optically couple the arm portions 121, 122 and the ring-shaped portion 123. Although the arm portions 121, 122 are in a linear shape and the ring-shaped portion 113 is in a rounded rectangle shape formed with two arc portions and two straight portions in the present embodiment, the shapes are not limited thereto, and the ring-shaped portion 123 may be in, for example, a circular shape or an elliptic shape.

The arm portions 121, 122 have one end exposed to the facet 102 of the cladding 101, and are connected at the other end with the optical coupling/branching portions 124, 125, respectively.

The optical coupling/branching portions 124, 125 have a 2×2 structure having two ports on an input side and two ports on an output side, and are of a directional coupling type or of an MMI type, but in the present embodiment, the MMI type is applied.

The arm portions 121, 122, and the ring-shaped portion 123 formed to have cross-sectional sizes to propagate light of a used wavelength in a single mode according to a relative refractive-index difference to the cladding 101. The optical coupling/branching portions 124, 125 are formed to have cross-sectional sizes to propagate light of a used wavelength (for example, 1.55 μm band) in a multiple mode according to a relative refractive-index difference to the cladding 101, and to obtain a branching ratio of 40:60.

The ring resonator filters 110, 120 are arranged such that a long axis (center line) along a longitudinal direction of the ring-shaped portion 113 and a long axis (center line) along a longitudinal direction of the ring-shaped portion 123 are substantially parallel to each other. The ring resonator filters 110, 120 both have periodic transmission characteristics to a wavelength of light. Strictly speaking, the ring resonator filters 110, 120 have periodic transmission characteristics to a frequency of light. However, because the characteristics are substantially periodic also to a wavelength, in the following, a description that there are periodic transmission characteristics to a wavelength of light may be included.

The ring resonator filters 110, 120 have transmission characteristics, cycles of which are substantially the same, and are set such that phases differ from each other in a range of ⅓ to ⅕ of one cycle. Therefore, when light L11 of one used wavelength is input from the arm portion 111, the ring resonator filter 110 transmits the light at a transmittance of the wavelength, and outputs light L12 from the arm portion 112. When light L21 having the same wavelength as the light L11 is input from the arm portion 121, the ring resonator filter 120 transmits the light at a transmittance of the wavelength, and outputs light L22 from the arm portion 122.

In the ring resonator filters 110, 120, the respective two ring portions 113, 123 cross each other at crossing points C1, C2. Moreover, the ring-shaped portion 123 and the arm portion 112 cross each other at a crossing point C3. As the two ring-shaped portions 113, 123 of the ring resonator filters 110, 120 thus cross each other, the ring-resonator filter device 100 that is compact in size, and in which an error from a designed phase difference is small can be implemented.

Figure 4:
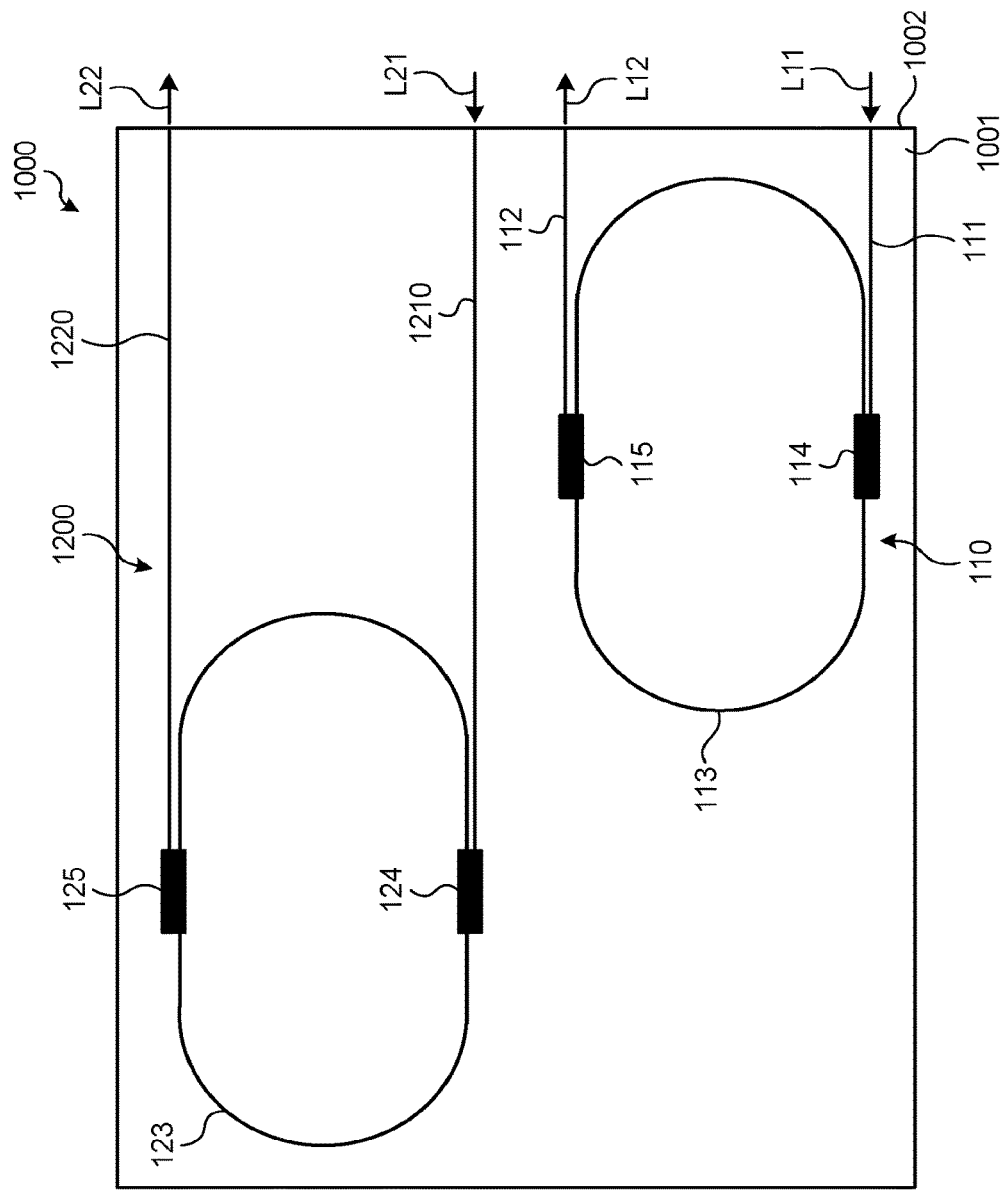
FIG. 4 is a schematic diagram of a ring-resonator device according to a comparative embodiment.

Hereinafter, it will be specifically explained. To explain an effect of the ring-resonator filter device 100, comparison with a ring-resonator filter device 1000 as a comparative embodiment illustrated in FIG. 4 will be performed. The ring-resonator filter device 1000 is constituted of a PLC having ring resonator filters 110, 1200 and a cladding 1001. The cladding 1001 has the same structure as the cladding 101 in FIG. 1. The ring resonator filter 1200 has a structure in which the arm portions 121, 122 in the ring resonator filter 120 in FIG. 1 are replaced with arm portions 1210, 1220. The arm portions 1210, 1220 are structured such that the length of the arm portions 121, 122 is extended, respectively, and one end thereof is exposed to one facet 1002 of the cladding 1001, and the other end is connected to the optical coupling/branching portions 124, 125, respectively. The ring resonator filters 110, 1200 are configured to have lengths and to be positioned such that the ring-shaped portions 113, 123 do not cross each other.

Figure 5:
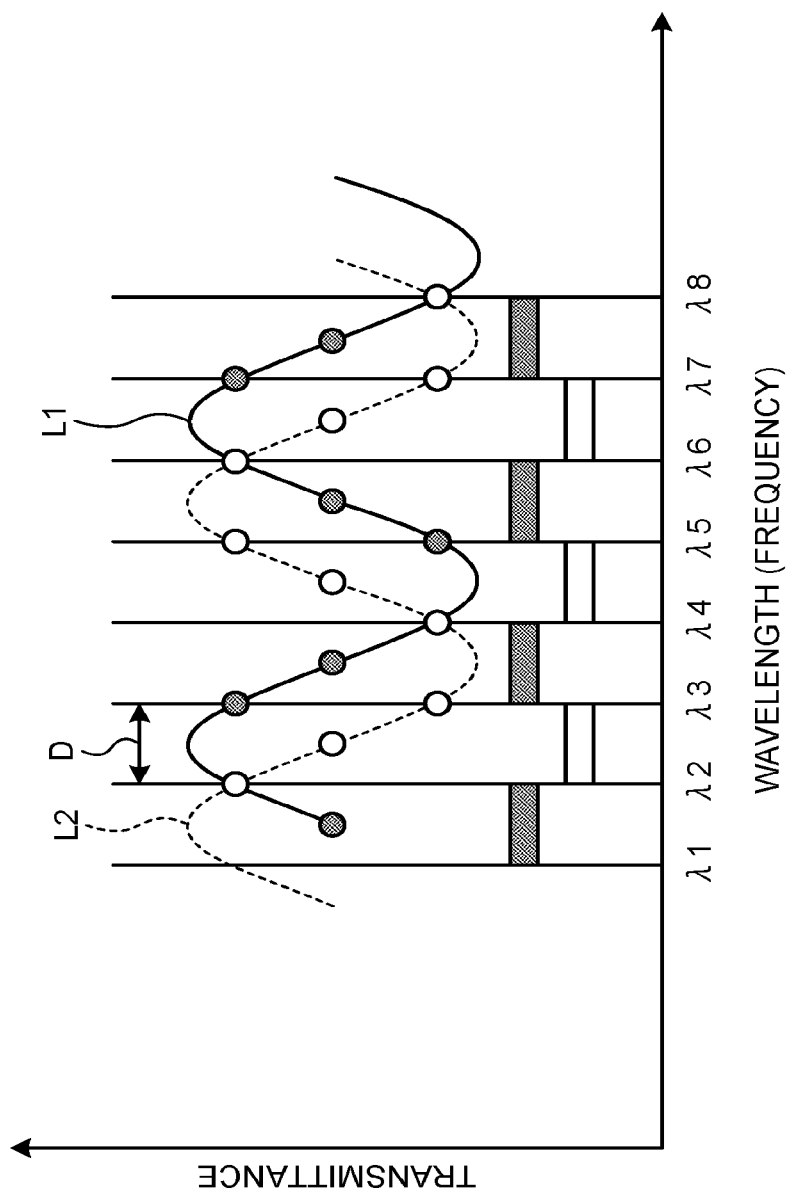
FIG. 5 is a diagram explaining a design of a wavelength locker device.

A case of using the ring-resonator filter device 100 or 1000 as a wavelength locker device will be explained. FIG. 5 is a diagram explaining a design of a wavelength locker device. FIG. 5 shows a spectrum of transmittance of the ring-resonator filter device 100 as a wavelength locker device. A solid line L1 shows a transmittance spectrum of the ring resonator filter 110, and a broken line L2 shows a transmittance spectrum of the ring resonator filter 120. Cycles of two transmittances spectrums are substantially the same, and have a phase difference D. In FIG. 5, the phase difference D is ⅓ of one cycle (FSR), and the unit is wavelength or frequency. When this ring-resonator filter device 100 is used as a wavelength locker device, a wavelength is detected by using a ring resonator filter having a larger inclination relative to a wavelength (or frequency) of the transmittance spectrum at the wavelength. For example, at wavelength between a wavelength λ1 and a wavelength λ2, between a wavelength λ3 and a wavelength λ4, between a wavelength λ5 and a wavelength λ6, between a wavelength λ7 and a wavelength λ8, a transmittance spectrum of the ring resonator filter 110, which is the solid line L1, as indicated by hatched circles and rectangles. Moreover, at wavelength between the wavelength λ2 and the wavelength λ3, between the wavelength λ4 and the wavelength λ5, between the wavelength λ6 and the wavelength λ7, a transmittance spectrum of the ring resonator filter 120, which is the broken line L2, is used as indicated by white circles and rectangles. That is, because which of the ring resonator filters 110, 120 is to be used to detect a wavelength is determined depending on a wavelength, the phase difference D is to be an important design item to increase the accuracy of wavelength detection.

The ring-resonator filter devices 100, 1000 are manufactured on a silicon or glass wafer by heretofore known flame hydrolysis deposition (FHD) method, heating process, photolithography technique, etching, and the like. According to the inventors of the present disclosure, it has been found that errors in size of a manufactured core depending on a position on a wafer can cause a phase difference being a different value from a designed value.

Figure 6:
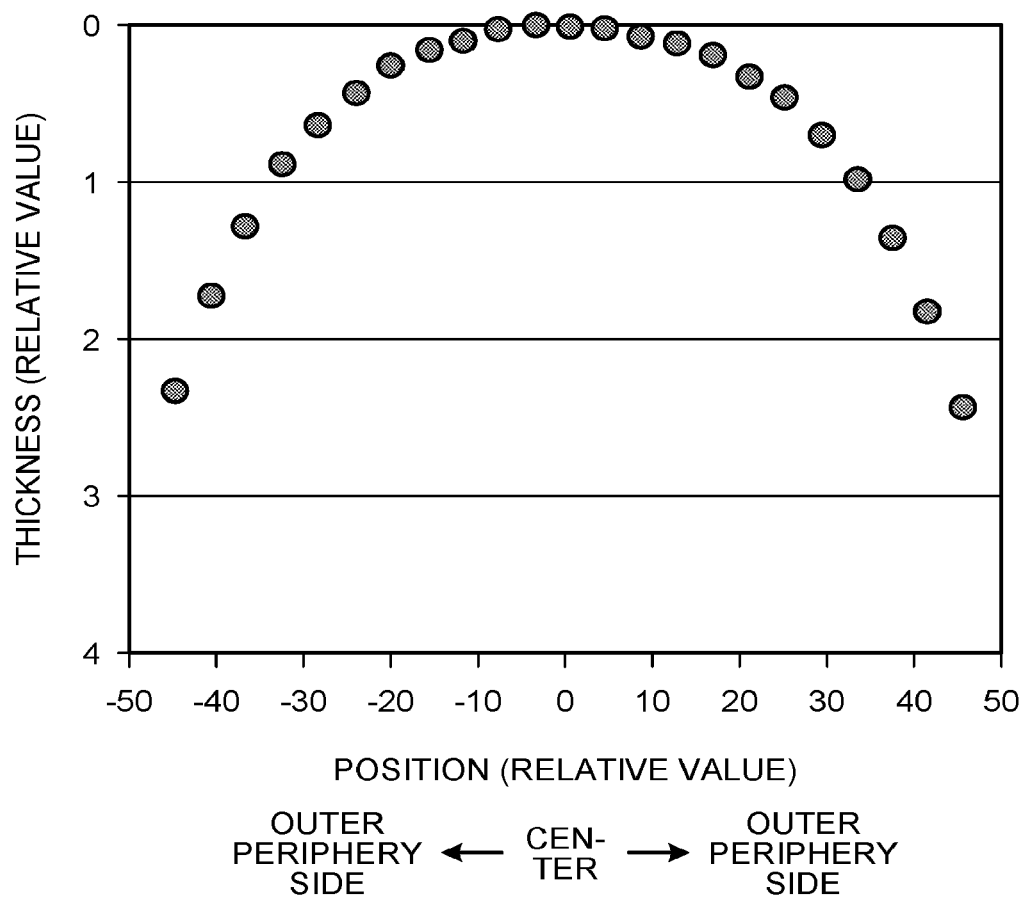
FIG. 6 is a diagram showing an example of a distribution of thickness of a core.
Figure 7:
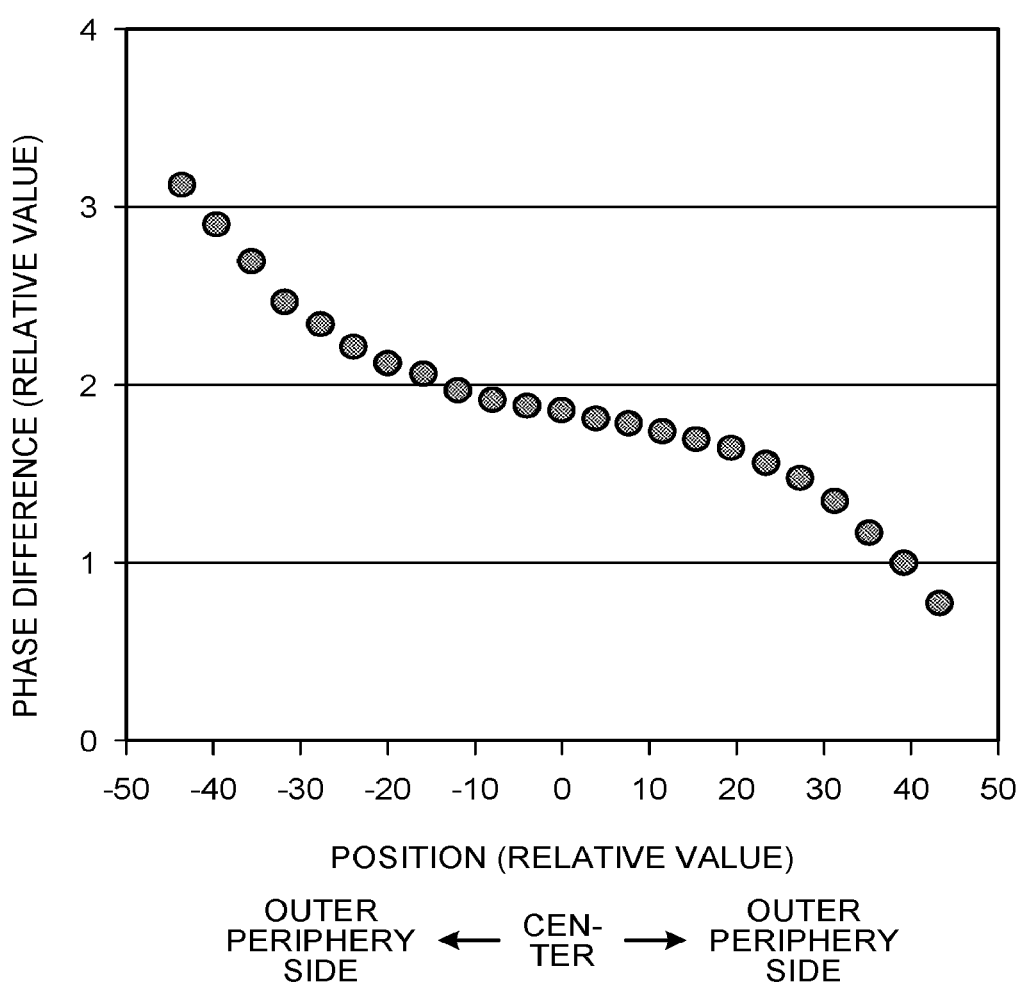
FIG. 7 is a diagram showing an example of a distribution of error in phase difference.

For example, FIG. 6 is a diagram showing an example of a distribution of thickness of the core depending on a position on a wafer. As shown in FIG. 6, there is a case in which the thickness of a core becomes smaller than a designed thickness as a position of the wafer shifts from the center toward an outer periphery side. FIG. 7 is a diagram showing an example of a distribution of errors in phase difference when the distribution as shown in FIG. 6 is observed. As shown in FIG. 7, it was confirmed that an error in phase difference becomes also large in a portion in which a variation in thickness for a position is large.

Figure 8:
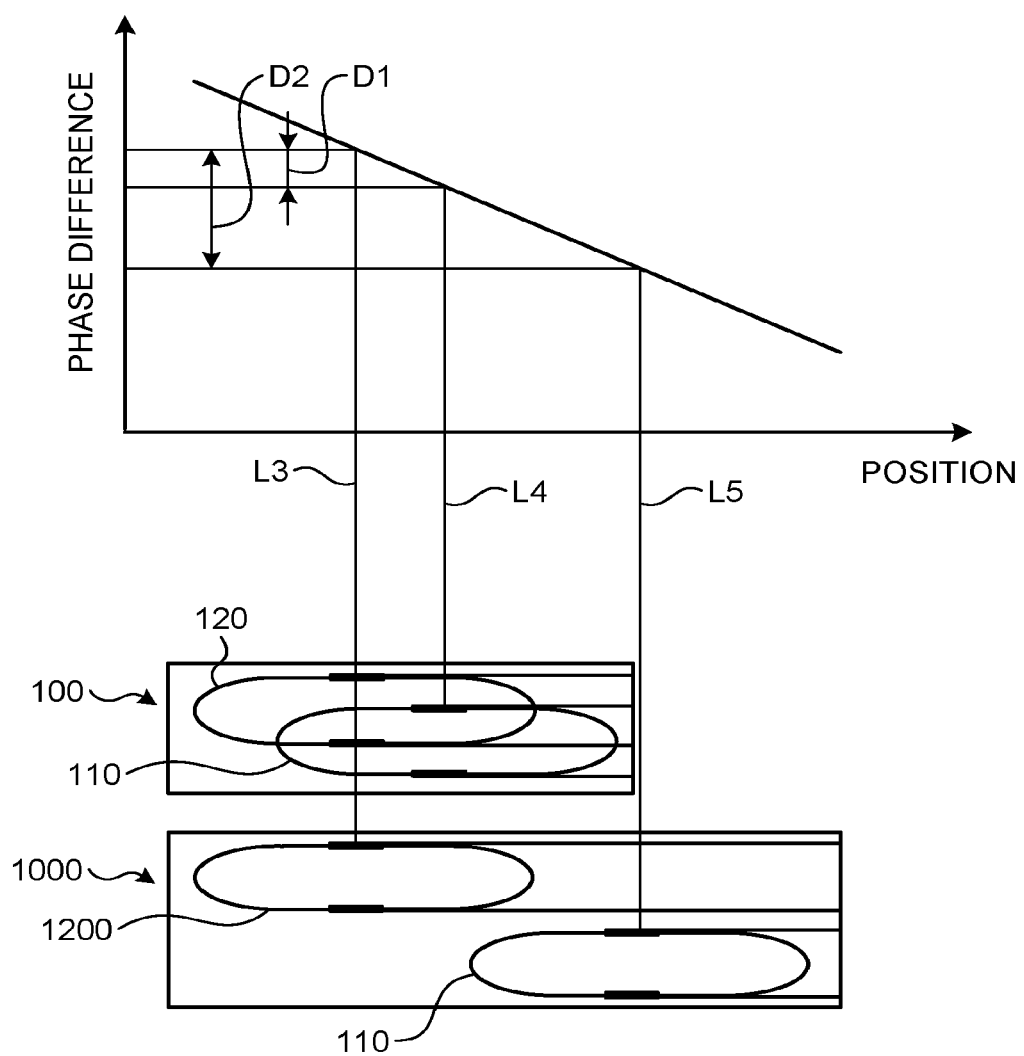
FIG. 8 is a schematic diagram illustrating a difference in errors in phase difference between the first embodiment and the comparative embodiment.

To solve this problem, the inventors of the present disclosure thought of a structure in which the two ring-shaped portions 113, 123 of the ring resonator filters 110, 120 cross each other. FIG. 8 is a schematic diagram illustrating a difference in phase difference between the first embodiment and the comparative embodiment. A line L3 indicates a center position of the ring resonator filter 110 of the ring-resonator filter devices 100, 1000, and a line L4 indicates a center position of the ring resonator filter 120 of the ring-resonator filter device 100, and a line L5 indicates a center position of the ring resonator filter 1200 of the ring-resonator filter device 1000. As shown in FIG. 8, when an error in phase difference is inclined with respect to positions, because a distance between the ring resonator filters 110, 1200 is large in the ring-resonator filter device 1000 of the comparative embodiment, an error in phase difference is large as a phase difference D2, but because the ring resonator filters 110, 120 cross each other and the distance therebetween is small in the ring-resonator filter device 100 of the first embodiment, an error in phase difference is small as a phase difference D1. Moreover, in the ring-resonator filter device 100, because a distance between the ring-resonator filters 110 and 120 is small, it is compact.

As described, the ring-resonator filter device 100 according to the first embodiment enables to be formed in a compact size, and to make an error in phase difference from a designed value small.

In the ring-resonator filter device 100, the two ring-shaped portions 113, 123 are substantially perpendicular to each other. Moreover, the ring-shaped portions 123 and the arm portion 112 are also substantially perpendicular to each other. Because the cores cross substantially perpendicularly to each other at crossing points C1, C2, C3, a cross loss can be minimized. For example, when a relative refractive-index difference of the core to the cladding is 5%, the cross loss when the cores perpendicularly cross can be suppressed to 0.1 dB or lower. Being substantially perpendicular to each other is not limited only to a state in which an angle at which two cores cross each other is 90 degrees, but includes a deviated state by a predetermined angle from 90 degrees also. The angle at which the two cores cross each other is preferable to be 80 degrees to 100 degrees, and is more preferable to be 90 degrees. Moreover, a curved waveguide and a linear waveguide being substantially perpendicular to each other means that a tangent line of the curved waveguide and the linear waveguide are being substantially perpendicular to each other. A curved waveguide and a curved waveguide being substantially perpendicular to each other means that tangent lines of the curved waveguides are being perpendicular to each other.

As an example and a comparative example of the present disclosure, ring-resonator filter devices having structures similar to the respective structures of the ring-resonator filter device 100 according to the first embodiment and the ring-resonator filter device 1000 according to the comparative embodiment were manufactured. In both the example and the comparative example, multiple pieces of devices were formed on a wafer, and 22 pieces of devices were acquired along a diameter direction passing through the center of the wafer as samples. As a result, it was found that the size of the example was 1.0 mm×1.5 mm when viewed from above, and the area was decreased by 40% from that of the comparative example. Moreover, the error in phase difference of the example is within 10 GHz, and it could be decreased to 50% or less of the comparative example.

Second Embodiment

Figure 2:
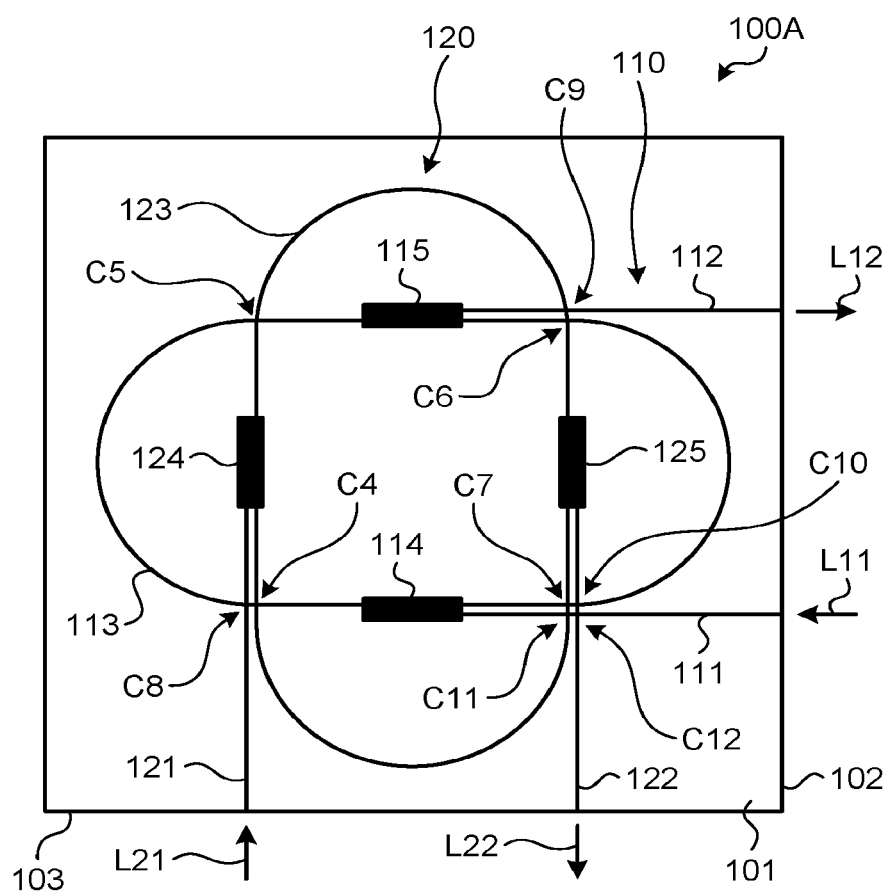
FIG. 2 is a schematic diagram of a ring-resonator filter device according to a second embodiment.

FIG. 2 is a schematic diagram of a ring-resonator filter device according to a second embodiment. This ring-resonator filter device 100A has a structure of the ring-resonator filter device 100 illustrated in FIG. 1 in which arrangement of the ring resonator filter 120 is changed.

Specifically, the ring resonator filter 120 is arranged such that one end of the arm portions 121, 122 expose to one facet 103 of the cladding 101. The facet 103 is a facet perpendicular to the facet 102. That is, the ring resonator filters 110, 120 are arranged such that a long axis (center line) along a longitudinal direction of the ring-shaped portion 113 and a long axis (center line) along a longitudinal direction of the ring-shaped portion 123 are substantially perpendicular to each other.

In the ring resonator filters 110, 120, the respective two ring-shaped portions 113, 123 cross each other at crossing points C4, C5, C6, C7. Moreover, the ring-shaped portion 113 and the arm portion 121 cross each other at a crossing point C8. Furthermore, the ring-shaped portion 123 and the arm portion 112 cross each other at a crossing point C9. Furthermore, the ring-shaped portion 113 and the arm portion 122 cross each other at a crossing point C10. Moreover, the ring-shaped portion 123 and the arm portion 111 cross each other at a crossing point C11. Furthermore, the arm portion 111 and the arm portion 122 cross each other at a crossing point C12. As the two ring-shaped portions 113, 123 of the ring resonator filters 110, 120 thus cross with other, the ring-resonator filter device 100 that is compact in size, and in which an error from a designed phase difference is small can be implemented.

Moreover, in the ring-resonator filter device 100A, because the ring resonator filters 110, 120 are arranged such that the long axis of the ring-shaped portion 113 and the long axis of the ring-shaped portion 123 are substantially perpendicular to each other, a shape viewed from above is to be close to a square, to increase the handling ability, and to be suitable for miniaturization. Moreover, because the cores are arranged to be substantially perpendicular to each other at the crossing points C4 to C12, the cross loss can be minimized.

Third Embodiment

Figure 3:
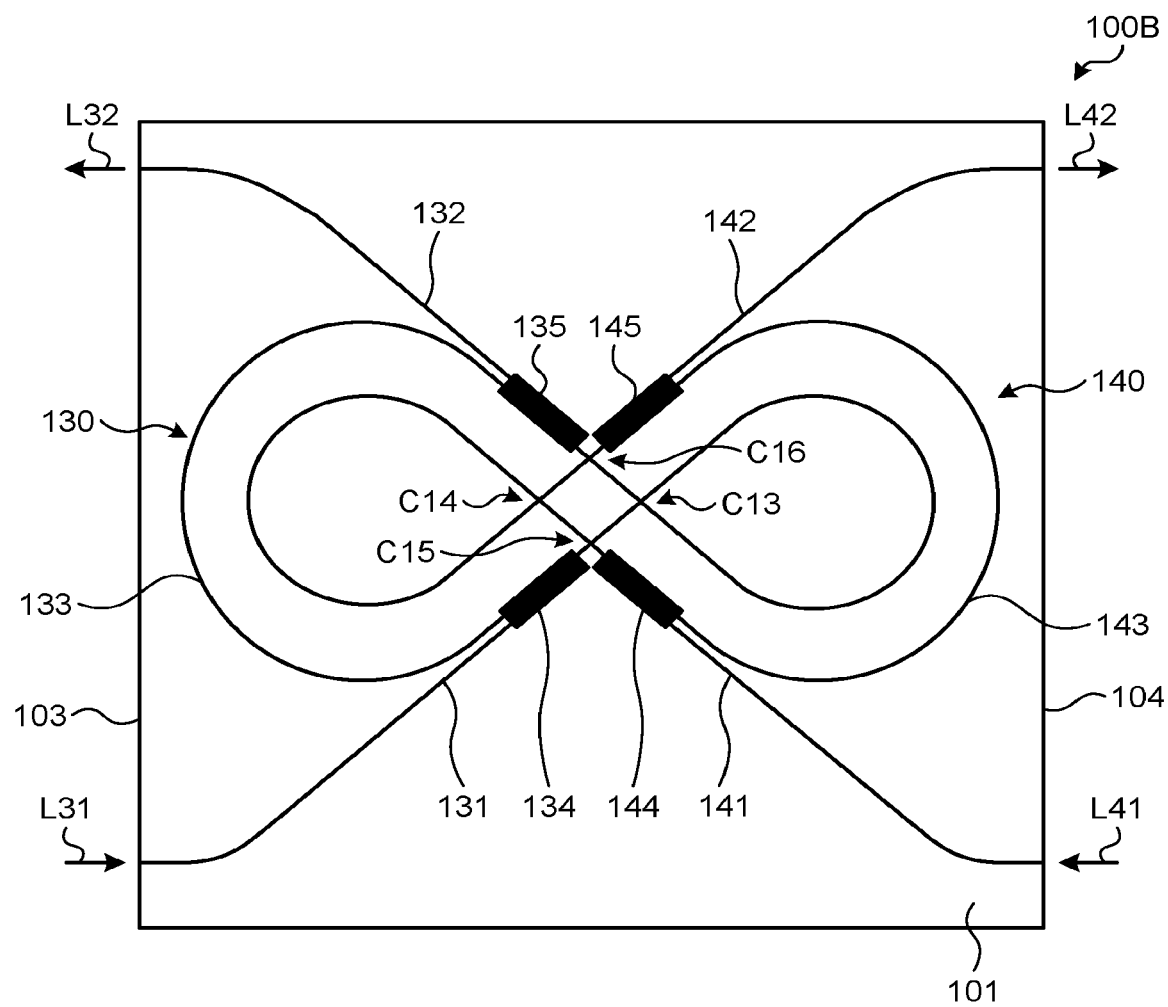
FIG. 3 is a schematic diagram of a ring-resonator filter device according to a third embodiment.

FIG. 3 is a schematic diagram of a ring-resonator filter device according to a third embodiment. This ring-resonator filter device 100B is constituted of a PLC that includes ring resonator filters 130, 140 constituted of cores, and the cladding 101.

The ring resonator filter 130 includes two arm portions 131, 132, a ring-shaped portion 133, and optical coupling/branching portions 134, 135 that optically couple the arm portions 131, 132 and the ring-shaped portion 133. In the present embodiment, the arm portions 131, 132 are in a curved shape and the ring-shaped portion 133 is in an 8-shaped crossing at a crossing point C13.

The arm portions 131, 132 have one end exposed to the facet 103 of the cladding 10, and are connected at the other end with the optical coupling/branching portions 134, 135, respectively.

The optical coupling/branching portions 134, 135 have a 2×2 structure, and are of a directional coupling type or of an MMI type, but in the present embodiment, the MMI type is applied.

The arm portions 131, 132, and the ring-shaped portion 133 formed to have cross-sectional sizes to propagate light of a used wavelength in a single mode according to a relative refractive-index difference to the cladding 101. The optical coupling/branching portions 134, 135 are formed to have cross-sectional sizes to propagate light of a used wavelength in a multiple mode according to a relative refractive-index difference to the cladding 101, and to obtain a branching ratio of 40:60.

The ring resonator filter 140 includes two arm portions 141, 142, a ring-shaped portion 143, and two optical coupling/branching portions 144, 145 that optically couple the arm portions 141, 142 and the ring-shaped portion 143. In the present embodiment, the arm portions 141, 142 are in a curved shape, and the ring-shaped portion 143 is in an 8-shaped crossing at a crossing point C14.

The arm portions 141, 142 have one end exposed to a facet 104 of the cladding 101, and are connected at the other end with the optical coupling/branching portions 144, 145, respectively.

The optical coupling/branching portions 144, 145 have a 2×2 structure having two ports on an input side and two ports on an output side, and are of a directional coupling type or of an MMI type, but in the present embodiment, the MMI type is applied.

The arm portions 141, 142, and the ring-shaped portion 143 formed to have cross-sectional sizes to propagate light of a used wavelength in a single mode according to a relative refractive-index difference to the cladding 101. The optical coupling/branching portions 144, 145 are formed to have cross-sectional sizes to propagate light of a used wavelength in a multiple mode according to a relative refractive-index difference to the cladding 101, and to obtain a branching ratio of 40:60.

The ring resonator filters 130, 140 are arranged such that the ring-shaped portions 133 and 143 are substantially parallel to each other. The ring-shaped portions 133, 143 being substantially parallel to each other means that a distance between two corresponding (opposite) points of the ring-shaped portions 133, 134 is substantially uniform.

The ring resonator filters 130, 140 have periodic transmission characteristics to a wavelength of light. The ring resonator filters 130, 140 are set to have periodic transmission characteristics, cycles of which are substantially the same, and such that that phases differ from each other in a range of ⅓ to ⅕ of one cycle. Therefore, when light L31 of one used wavelength is input from the arm portion 131, the ring resonator filter 130 transmits the light at a transmittance of the wavelength, and outputs light L32 from the arm portion 132. When light L41 having the same wavelength as the light L31 is input from the arm portion 141, the ring resonator filter 140 transmits the light at a transmittance of the wavelength, and outputs light L42 from the arm portion 142.

In the ring resonator filters 130, 140, the respective two ring-shaped portions 133, 143 cross each other at crossing points C15, C16. As the two ring-shaped portions 133, 143 of the ring resonator filters 130, 140 thus cross each other, the ring-resonator filter device 100B that is compact in size, and in which an error from a designed phase difference is small can be implemented.

Moreover, in the ring-resonator filter device 100B, because the ring-shaped portions 133, 143 are in an 8-shape, and are arranged to be substantially parallel to each other, it is further suitable for downsizing. Furthermore, because the optical coupling/branching portions 134, 135, 144, 145 are arranged on an outer side of the crossing points C15, C16, the number of crossing points is reduced.

Although the ring-shaped portions 133, 143 are arranged to be substantially parallel to each other in the ring-resonator filter device 100B, they may be arranged such that the longitudinal directions of the ring resonator filters 130, 140 cross or are perpendicular to each other as in the second embodiment.

Moreover, although the respective input/output portions of the waveguides of the ring-shaped portions 131, 132, 141, 142 are arranged at different end portions (facets) of a chip of the ring-resonator filter device 100B, they may be arranged on the same end portion (facet).

Furthermore, because the ring-resonator filter device according to the above embodiments are compact in size, and have a small error from a designed phase difference, the manufacturing yield can be improved, and because more devices can be acquired from one wafer, the manufactuarability is also high.

The present disclosure can be applied to a ring-resonator filter device.

According to the present disclosure, an effect that a ring-resonator filter device that is compact in size, and that can make an error from a designed phase difference small can be implemented is produced.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A ring-resonator filter device comprising:
a waveguide device that includes a core, wherein
the core constitutes two ring resonator filters,
each of the two ring resonator filters includes two arm portions, a ring-shaped portion, and two optical coupling/branching portions that optically couple the two arm portions and the ring-shaped portion, respectively, and
the two ring-shaped portions cross each other, each of the two ring-shaped portions being formed in an 8-shape.

2. The ring-resonator filter device according to claim 1, wherein
there are points at which the two ring-shaped portions are substantially perpendicular to each other.

3. The ring-resonator filter device according to claim 1, wherein
the two ring-shaped portions are substantially perpendicular to each other at two points.

4. The ring-resonator filter device according to claim 1, wherein
the two optical coupling/branching portions included in one ring resonator filter out of the two ring resonator filters are positioned on an outer side of another ring resonator filter out of the two ring resonator filters, and
the two optical coupling/branching portions included in the another ring resonator filter are positioned on an outer side of the one ring resonator filter.

5. The ring-resonator filter device according to claim 1, wherein
the two ring-shaped portions are arranged to be substantially parallel to each other.

6. The ring-resonator filter device according to claim 1, wherein
the two ring-shaped portions are arranged in point symmetry to each other with respect to a center point between a first crossing point at which a first 8-shape of a first one of the two ring-shaped portions crosses and a second crossing point at which a second 8-shape of a second one of the two ring-shaped portions crosses.

7. The ring-resonator filter device according to claim 1, wherein
a relative refractive-index difference of the core to a cladding is 2.5% or higher.

8. The ring-resonator filter device according to claim 1, wherein the waveguide device is a silica-based planar lightwave circuit.

* * * * *